(12) United States Patent
Tatemura et al.

(10) Patent No.: US 6,700,639 B2
(45) Date of Patent: Mar. 2, 2004

(54) LIQUID CRYSTAL DISPLAY APPARATUS AND PRODUCTION METHOD

(75) Inventors: Makoto Tatemura, Yokohama (JP); Masashi Sawa, Yokosuka (JP); Katsumi Kobara, Mobara (JP)

(73) Assignee: Hitachi, Ltd., Tokyo (JP)

( * ) Notice: Subject to any disclaimer, the term of this patent is extended or adjusted under 35 U.S.C. 154(b) by 302 days.

(21) Appl. No.: 09/791,624

(22) Filed: Feb. 26, 2001

(65) Prior Publication Data

US 2002/0001059 A1 Jan. 3, 2002

(30) Foreign Application Priority Data

May 23, 2000 (JP) .......................... 2000-151783
Nov. 10, 2000 (JP) .......................... 2000-349308

(51) Int. Cl.⁷ .................................. G02F 1/13
(52) U.S. Cl. .................. 349/200; 349/158; 349/122; 349/22
(58) Field of Search ................... 349/200, 158, 349/122, 22

(56) References Cited

U.S. PATENT DOCUMENTS

| | | | |
|---|---|---|---|
| 3,909,226 A | 9/1975 | McCourty et al. | |
| 4,826,522 A | 5/1989 | d'Iribarne et al. | |
| 5,385,786 A | 1/1995 | Shetterly et al. | |
| 5,742,006 A | * 4/1998 | Grupp et al. | 174/52.2 |

FOREIGN PATENT DOCUMENTS

| | | |
|---|---|---|
| EP | 0887180 | 12/1998 |
| JP | 06-048755 | 2/1994 |
| JP | 07-328781 | 12/1995 |
| JP | 09-12327 | 1/1997 |
| WO | 00/47529 | 8/2000 |

* cited by examiner

Primary Examiner—Robert H. Kim
Assistant Examiner—George Y. Wang
(74) Attorney, Agent, or Firm—Mattingly, Stangley & Malur, P.C.

(57) ABSTRACT

A glass sheet for a liquid crystal display apparatus with a scribe groove formed thereon is divided by cooling the scribe groove and its surroundings and heating surrounding areas on both sides of the scribe groove to extend the scribe groove to a backside of the glass sheet, resulting in uniform distribution of residual stress on a cutting area. Also disclosed is a method for cutting a thin sheet of brittle material such as glass or ceramics by extending a scribe groove without deformation or impact so that peeling or cracking is reduced.

4 Claims, 8 Drawing Sheets

LIQUID CRYSTAL DISPLAY APPARATUS AND PRODUCTION METHOD

FIELD OF THE INVENTION

The present invention relates to an art for cutting a thin sheet of brittle material such as glass or ceramics, and in particular, to a sheet cutting method and apparatus which are applicable to, for example, cutting a glass sheet used for a liquid crystal display apparatus and to a liquid crystal display apparatus which is produced by using the method and apparatus.

BACKGROUND OF THE INVENTION

In general, cutting of a thin sheet of brittle material such as glass and ceramics is often accomplished by sequentially performing a scribe process and a break process. The scribe process is a process to form a very shallow scribe groove together with a short crack (vertical crack) extending vertically from a bottom of the scribe groove by moving an abacus ball-like wheel cutter and the brittle material relatively to each other while pressing the wheel cutter against the brittle material. For example, when the glass sheet is 0.7 mm thick, a bite depth of the wheel cutter is set to approximately 5 $\mu$m to form a scribe groove having a width of approximately 10 $\mu$m and a vertical crack having a depth equal to approximately 20% of the thickness of the glass sheet (approximately 130 $\mu$m). The break process is a process to divide the sheet after the scribe process by bending it along the scribe groove or pressing rubber against it to cause the vertical crack in the scribe groove to reach the backside of the sheet.

As is well known to those skilled in the art, a liquid crystal display plate is configured by bonding together two glass sheets through seal material, and one of the glass sheets has a circuit element pattern formed thereon and the other has a color filter pattern formed thereon. In manufacturing of the liquid crystal display plates, a many-at-once production approach is generally adopted, that is, circuit patterns for a plurality of crystal liquid display plates are formed on a mother glass sheet, color filter patterns for the plurality of crystal liquid display plates are formed on another mother glass sheet, these two mother glass sheets are bonded together through seal materials which are respectively formed for crystal liquid display plates, and finally each crystal liquid display plate is cut off from the bonded mother glass sheets. When cutting off from each crystal liquid display plate, the glass sheet with the circuit pattern may be sometimes cut at a location slightly different from that on the other glass sheet with the color filter pattern because of taking out of wiring. Therefore, it is not easy to accomplish the break process by bending or folding the glass sheets to cut off each liquid display plate because the two glass sheets are bonded together and some of their cutting locations are slightly different from each other.

As described in JP-A-6-48755 specification, a method for dividing two bonded glass sheets has been proposed, wherein a rubber plate and the like is pressed against the bonded glass sheets formed by sticking two glass sheets together from the backside of a scribe groove to extend a vertical crack in the scribe groove. This method is applicable to such two bonded glass sheets as well as to those having slightly different cutting locations because it does not cause remarkable bending deformation in the glass sheets. However, this method may have an impact on the glass sheets when the rubber plate is pressed against them from the backside of the scribe groove. Thus, such an impact may be likely to cause some chipping or crack in the glass sheets or to break the wiring, degrading the performance of the glass sheets in a final product.

As described in JP-A-9-12327 specification, another method for dividing such glass sheets is known to those skilled in the art, wherein the division is accomplished without any bending deformation in or any impact on the glass sheets by irradiating the surface of the glass sheets with laser light to heat the surface of the glass sheets locally and then quenching the glass sheets. According to this method, a heated area is quenched to cause some tensile stress in a quenched scribe groove and then a vertical crack in the scribe groove is extended to allow the glass sheets to be divided. This method can suppress some factor for performance degradation of the glass sheets in a final product because it does not cause any impact on or bending deformation in the glass sheets. In addition, this method is characterized by direct irradiation of laser light on the scribe groove for heating. When the scribe groove is mechanically formed with a wheel cutter or the like, the edge of the wheel cutter may exert pressure on the scribe groove to cause distortion around the scribe groove, because the wheel cutter is kept pressed against the glass sheets during the groove formation. When the scribe groove is formed with laser light, the heat of laser light may cause distortion around the scribe groove. Thus, if an amount of heat is applied to the scribe groove by directly irradiating it with laser light, distortion may be increased to cause some crack in an in-plane direction in the glass sheets or cause some glass piece to be peeled off along the scribe groove and these phenomena may degrade the quality of the divided glass sheets. In particular, for an improved throughput of the break process, laser light must be moved along the scribe groove at a higher speed. However, if laser light is simply moved at a higher speed, the amount of heat to be applied to the glass sheets through laser irradiation will be decreased with no tensile stress leading to division. Therefore, the irradiation output of laser light must be increased to secure a required amount of heat at a higher moving speed but such an increased laser irradiation output will cause the distortion around the scribe groove to affect the glass sheets, resulting in some crack in the in-plane direction in the glass sheets or some glass piece to be peeled off along the scribe groove.

Also, as described in JP-A-7-328781 specification, a method to form a scribe groove by applying two lasers to a glass sheet in the vicinity of a scribe groove predetermined line is known to those skilled in the art. Similarly to the above-mentioned method wherein the glass sheet is irradiated with laser light to form the scribe groove, this method forms the scribe groove by applying some heat to the glass sheet surface around the scribe groove predetermined line to cause some tensile stress there. However, this method differs from the above-mentioned method in that the scribe groove predetermined line is not directly irradiated with laser and thus a less amount of heat is applied to the scribe groove predetermined line, so that any heat influence on workpieces can be reduced and the working speed can be increased by two to five times as compared with the above-mentioned method of forming a scribe groove through direct laser irradiation.

However, similarly to the above-mentioned laser irradiation, this method also irradiates the glass sheets locally with laser and forms the scribe groove while moving. Thus, the laser moving speed for the "scribe groove forming process" can be increased by approximately five times but these two methods of using laser may cause the following problem when they are simply applied to the "cutting process" for an improved throughput. That is, the speed of laser light which moves along the scribe groove predetermined line in the cutting process must be increased to improve the throughput but if the moving speed of laser light is simply increased, the amount of heat to be applied to the glass sheets will be decreased, resulting in no tensile stress which leads to scribe groove formation and eventually no cutting. To avoid this disadvantage, the irradiation output of laser light must be increased to secure a required amount of heat and to keep a higher moving speed but similarly to the above-mentioned method of laser irradiation, such an increased laser irradiation output will cause the distortion around the scribe groove to affect the glass sheets, resulting in some crack in the in-plane direction in the glass sheets or some glass piece to be peeled off along the scribe groove.

As described above, the prior art described in JP-A-6-48755 specification has the disadvantage that it may have an impact on the glass sheets when the rubber plate is pressed against them from the backside of the scribe groove and thus, such an impact may be likely to cause some chips or cracks in the glass sheets or to break the wiring, degrading the performance of the glass sheets in a final product. Another prior arts described in JP-A-9-12327 specification and JP-A-7-328781 specification have the disadvantage that the irradiation output of laser light is forced to be increased for an improved throughput in the "cutting process" and thus, such an increased laser irradiation output will cause the distortion around the scribe groove to affect the glass sheets, resulting in some crack in the in-plane direction in the glass sheets or some glass piece to be peeled off along the scribe groove and degrading the performance of the glass sheets in a final product.

Particularly, in manufacturing of liquid crystal display plates, a many-at-once production approach is generally adopted, that is, circuit patterns for a plurality of crystal liquid display plates are formed on a mother glass sheet, color filter patterns for the plurality of crystal liquid display plates are formed on another mother glass sheet, these two mother glass sheets are bonded together through seal materials which are respectively formed for the crystal liquid display plates, and finally each crystal liquid display plate is cut off from the bonded mother glass sheets. With a recent increase in demand for liquid crystal display plates, the number of liquid crystal display plates to be cut off at a time is increased and the image display section for each liquid crystal display plate is also increased in size, resulting in larger and larger mother glass sheets. This leads to a significantly increased cutting speed with respect to the length of cutting each liquid crystal display section in the cutting process. However, the prior arts cannot accommodate such an increased speed.

SUMMARY OF THE INVENTION

The present invention has been achieved in light of the foregoing and it is an object of the present invention to provide an efficient cutting method and apparatus which are accomplished by using a cutting technique for cutting a thin sheet of brittle material such as glass or ceramics through heat shrinkage without remarkable deformation or impact and which can reduce as low as possible the likelihood that some crack will be caused in the in-plane direction in the thin sheet or some glass piece will be peeled off along a scribe groove, avoiding any performance degradation in glass sheets in a final product, as well as to provide a liquid crystal display plate which is produced by using such a method.

To attain the above object, the present invention typically disclosed in this application heats surrounding areas on both sides of a scribe groove to cause specific minute bending deformation in the vicinity of the scribe groove and thus tensile stress in the vicinity of an extremity of a scribe groove cracking so that a vertical crack may extend from the scribe groove to the backside of a thin sheet to eventually cut the thin sheet.

To attain the above object, a liquid crystal display apparatus according to the present invention is one having a liquid crystal display plate, in which a value of residual stress at a distance of 3 mm or less from edges of the liquid crystal display plate is approximately constant within a range of 0.1 to 5 $kgf/cm^2$.

To attain the above object, a liquid crystal display apparatus according to the present invention is one having a liquid crystal display plate, in which a value of residual stress at a distance of 3 mm or less from at least one edge of the liquid crystal display plate is approximately constant within a range of 0.1 to 5 $kgf/cm^2$.

To attain the above and other objects, a liquid crystal display apparatus according to the present invention is one having a liquid crystal display plate, in which a value of residual stress at a distance of 3 mm or less from the edges of the liquid crystal display plate is approximately constant within a range of 0.1 to 10 $kgf/cm^2$.

To attain the above object, a liquid crystal display apparatus according to the present invention is one having a liquid crystal display plate, in which a value of residual stress at a distance of 3 mm or less from at least one edge of the liquid crystal display plate is approximately constant within a range of 0.1 to 10 $kgf/cm^2$.

To attain the above object, a liquid crystal display apparatus according to the present invention is one having a liquid crystal display plate, in which a value of residual stress at a distance of 1 mm or less from the edges of the liquid crystal display plate is approximately constant within a range of 0.1 to 10 $kgf/cm^2$.

To attain the above object, a liquid crystal display apparatus according to the present invention is one having a liquid crystal display plate, in which a value of residual stress at a distance of 1 mm or less from at least one edge of the liquid crystal display plate is approximately constant within a range of 0.1 to 10 $kgf/cm^2$.

To attain the above object, a method for producing a liquid crystal display apparatus according to the present invention includes step of mechanically forming a scribe groove on a glass sheet having a plurality of liquid crystal display plates and step of cutting the glass sheet by applying a predetermined amount of heat in correspondence to a thickness of the glass sheet to areas on both sides of the scribe groove.

To attain the above object, a method for producing a liquid crystal display apparatus according to the present invention includes step of mechanically forming a scribe groove on a glass sheet having a plurality of liquid crystal display plates, step of placing a hot wire on an upper surface of the glass sheet on each side of the scribe groove, and step of cutting the glass sheet by simultaneously applying a predetermined voltage to the two hot wires.

To attain the above object, a method for producing a liquid crystal display apparatus according to the present invention includes step of mechanically forming a scribe groove on a glass sheet having a plurality of liquid crystal display plates and step of cutting the glass sheet by simultaneously heating an area of a predetermined length on each side of the scribe groove.

To attain the above object, a method for producing a liquid crystal display apparatus according to the present invention is a method for producing a liquid crystal display apparatus which comprises: a liquid crystal display plate having a first glass sheet with a liquid crystal display circuit pattern formed thereon; and a second glass sheet with a liquid crystal display color filter pattern formed thereon, in which the method includes step of mechanically forming a scribe groove on the first glass sheet, first cutting step of cutting the first glass sheet by simultaneously heating an area of a predetermined length on each side of the scribe groove on the first glass sheet, step of mechanically forming a scribe groove on the second glass sheet, second cutting step of cutting the second glass sheet by simultaneously heating an area of a predetermined length on each side of the scribe groove on the second glass sheet.

DESCRIPTION OF THE PREFERRED EMBODIMENTS

Now, the embodiments of the present invention will be described hereinafter with reference to the drawings. It should be appreciated that, in each of the embodiments described hereinafter, a laminated glass sheet which is produced by bonding together a mother glass sheet with a circuit pattern for a plurality of liquid crystal display plates formed thereon and another mother glass sheet with a color filter pattern for the plurality of liquid crystal display plates through seal material respectively formed for liquid crystal display plates is made to be a thin sheet to be cut, but such a thin sheet is not limited to a glass sheet.

Figure 1:
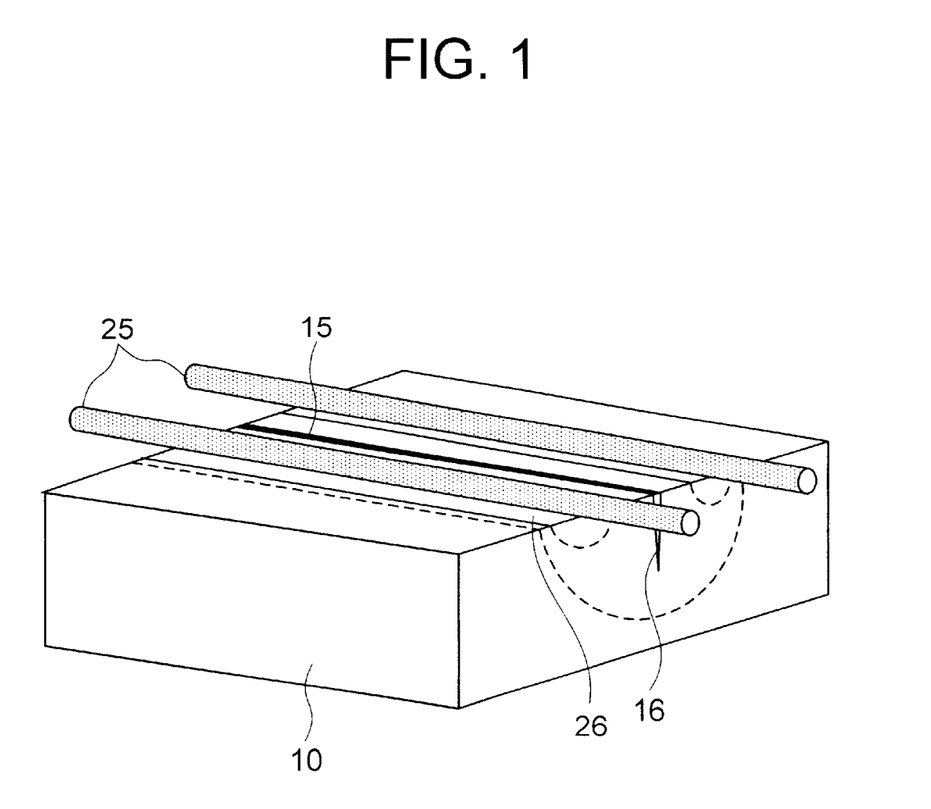
FIG. 1 is a view showing a configuration of a method and apparatus for cutting a glass sheet according to the present invention.

FIG. 1 is a view showing a method and apparatus for cutting a glass sheet according to a first embodiment of the present invention. As shown in FIG. 1, a scribe groove 15 has been previously formed on a glass sheet 10. Formation of the scribe groove 15 can be accomplished by mechanically forming it with a wheel cutter or by creating it through heat shrinkage caused by heating with laser light and cooling with a cooling medium, but it is desirable that a scribe groove is mechanically formed with a wheel cutter in order to reduce the length of time for the scribe process. It is most desirable that the depth 16 of the scribe groove 15 is within a range of 10 to 20% of a sheet thickness from the viewpoint of reducing the length of time for the scribe process, but the present invention is not limited to such a range of depth.

The glass sheet with the scribe groove 15 formed through the above-mentioned methods is heated at surrounding areas on both sides of the scribe groove 15 by using wire- or strip-like heating elements 25 heated up to 100° C. or more as shown in FIG. 1. It should be appreciated that the heating step in this embodiment is performed by using two Nichrome wires as the heating elements 25. The diameter of each Nichrome wire is within a range of 0.2 to 1.0 mm and the two Nichrome wires are placed symmetrically with respect to the scribe groove. The distance between the two Nichrome wires is an important setting factor and it has been experimentally confirmed that a preferred distance is within a range of 0.1 to 10 mm. The area heated on the glass sheet is distributed like a heated area 26 shown in FIG. 1.

A simulation analysis was made on stress distributions around the scribe groove 15, one of the distributions being caused through the method of heating the surrounding areas on both sides of the scribe groove 15 as shown in FIG. 1 and the other being caused through the method of directly heating the scribe groove 15 (prior art), and the results are shown in FIGS. 2A, 2B, 3A and 3B. The experiment was performed on condition that the sheet thickness of the glass sheet 10 was 0.7 mm, the depth 16 of the scribe groove 15 was approximately 130 μm, and the total output for both side heating was 2 W/mm (the amount of heat per 1 mm in the direction of Nichrome wire) and the output for direct heating was 2 W/mm (the amount of heat per 1 mm in the direction of laser traveling). For the method of heating the surrounding areas on both sides of the scribe groove 15, the distance between two Nichrome wires was 10 mm.

Figure 2A:
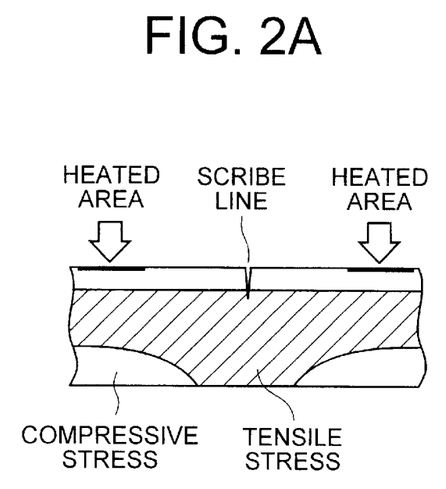
FIGS. 2A and 2B are views showing stress distributions within a cross-section of the glass sheet during a glass sheet cutting process.
Figure 2B:
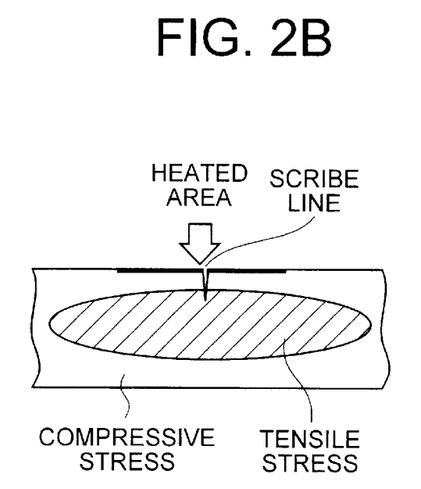
Figure 3A:
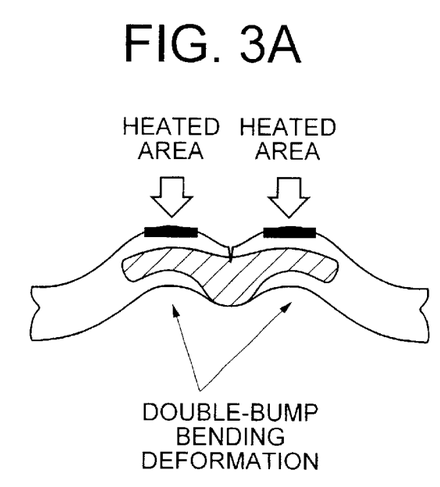
FIGS. 3A and 3B are views showing glass sheet deformation during the glass sheet cutting process.
Figure 3B:
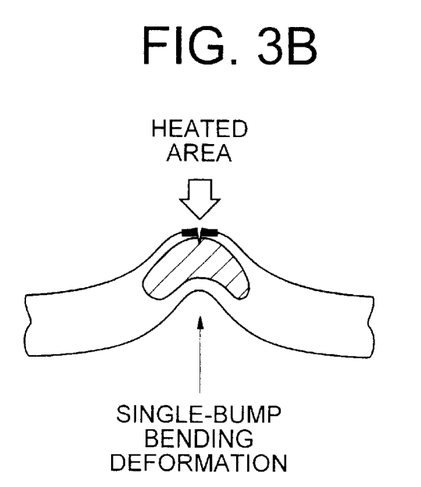

FIG. 2A shows a stress distribution within a cross-section of the glass sheet 10 when the surrounding areas on both sides of the scribe groove 15 were heated. FIG. 2B shows another stress distribution within the cross-section of the glass sheet 10 when the scribe groove 15 was directly heated (prior art). FIGS. 3A and 3B show deformed cross-sections of the glass sheet 10, one of the deformed cross-sections being caused through the method of heating the surrounding areas on both sides of the scribe groove 15 and the other being caused through the method of directly heating the scribe groove 15. More specifically, FIG. 3A shows a deformed cross-section of the glass sheet 10 when the surrounding areas on both sides of the scribe groove 15 were heated and FIG. 3B shows another deformed cross-section of the glass sheet 10 when the scribe groove 15 was directly heated.

As seen from FIGS. 2A and 3A, when the surrounding areas on both sides of the scribe groove 15 are heated, in the stress distribution around the scribe groove, tensile stress extends from the lower portion of the scribe groove to the backside of the glass sheet 10. Deformation of the glass sheet 10 occurs in the form of double-bump deformation because the areas on both sides of the scribe groove 15 are heated and thus the surroundings of the heated areas are expanded by heat to produce two bumps. This causes the backside of the glass sheet 10 beneath the scribe groove to be deformed into a bump and tensile stress to be extended also in the backside of the glass sheet beneath the scribe groove. When the surrounding areas on both sides of the scribe groove 15 are heated on condition that the total output is 2 W/mm and the sheet thickness of the glass sheet 10 is 0.7 mm, a stress (tensile stress) of 10 to 20 MPa is obtained at the bump on the backside beneath the scribe groove.

On the contrary, when the scribe groove 15 is directly heated, tensile stress occurs only around the lower portion of the scribe groove and compressive stress occurs on the backside of the glass sheet 10. Deformation of the glass sheet 10 occurs in the form of single-bump deformation because the scribe groove 15 is directly heated and thus the area around the scribe groove 15 is raised. This causes the backside of the glass sheet 10 beneath the scribe groove to be deformed into a dip and compressive stress to be distributed in the backside of the glass sheet beneath the scribe groove 15. When the scribe groove 15 is directly heated on condition that the total output is 2 W and the sheet thickness of the glass sheet 10 is 0.7 mm, a stress (compressive stress) of −20 to 40 MPa is obtained on the backside beneath the scribe groove.

Figure 4A:
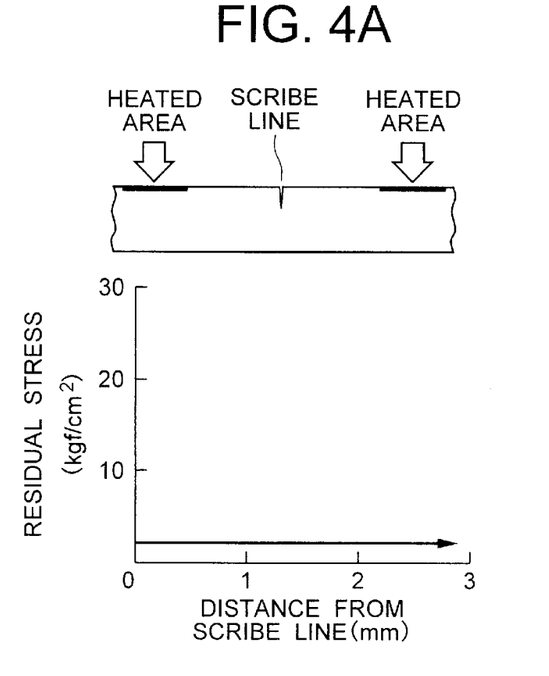
FIGS. 4A and 4B are graphs showing relationship between a distance from a scribe line and a residual stress remaining on the glass sheet after cutting.
Figure 4B:
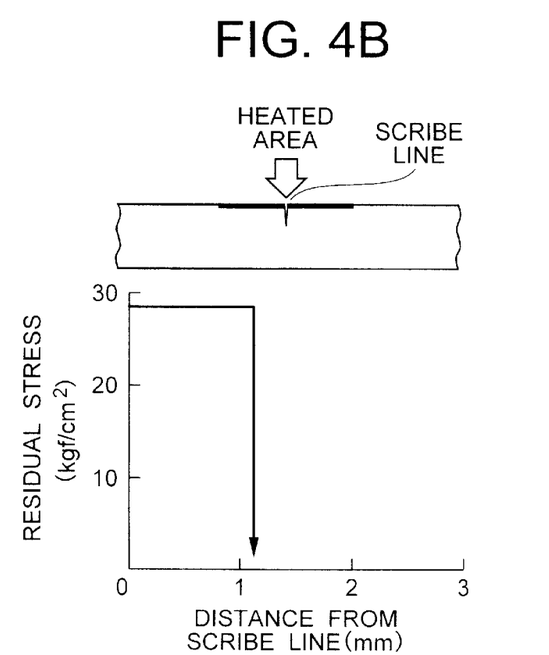

FIGS. 4A and 4B show the relationship between the distance from a scribe line on a glass sheet or a liquid crystal display plate and the residual stress remaining on the glass sheet after cutting when the surrounding areas on both sides of the scribe groove 15 are heated and when the scribe groove 15 is directly heated under the above described conditions. It should be appreciated that the distance from a scribe line is equal to the distance from an edge of the liquid crystal display plate after cutting. More specifically, FIG. 4A shows the relationship between the distance from a scribe line and the residual stress after breaking when the surrounding areas on both sides of the scribe groove 15 are heated and a vertical crack extends. FIG. 4B shows the relationship between the distance from a scribe line and the residual stress after breaking when the scribe groove 15 is directly heated. It should be appreciated that the glass sheet cannot be broken simply by directly heating the scribe groove as shown in FIG. 4B. Therefore, the residual stress shown in FIG. 4B is measured after the glass sheet has been broken by directly heating the scribe groove 15 and quenching it with a coolant.

As shown in FIG. 4A, the value of residual stress at a distance of 3 mm or less from the scribe groove was approximately constant within a range of approximately 0.1 to 5 kgf/cm$^2$ when the glass sheet was broken after the surrounding areas on both sides of the scribe groove 15 (the areas at a distance of 5 mm from the scribe line in this embodiment) are heated. The residual stress is distributed almost uniformly throughout the surroundings of the scribe groove 15 and it can be restrained to a low value. Such uniform and low-level distribution of residual stress can reduce or prevent glass peeling or chipping at any cut area in the glass sheet after the cutting process. In general, the phenomenon of glass peeling may start to occur when the value of residual stress exceeds 10 kgf/cm$^2$ and thus these problems can be eliminated if the value of residual stress is within a range of 0.1 to 5 kgf/cm$^2$ as described above. It should be appreciated that almost uniform distribution of residual stress can be also obtained within a range of 5 to 10 kgf/cm$^2$ under conditions other than those described above for this embodiment (the method of heating the surrounding areas on both sides) and this range can fall within the scope of the present invention.

A glass sheet used for a liquid crystal display apparatus usually has a color filter pattern and a circuit pattern for liquid crystal display but it is desired that any glass margin irrelevant to such patterns is reduced as much as possible due to the need for weight saving and downsizing. As shown in FIG. 4A, according to the present invention, the value of residual stress at a distance of 1 mm or less, 1 to 2 mm, or 2 to 3 mm from the scribe line can be kept almost constant and very low after glass cutting and even a very narrow glass margin of, for example, 1 mm or 2 mm wide can minimize any possible influence on the above-mentioned patterns.

On the contrary, the value of residual stress at a distance of 1 mm or less from the scribe groove 15 in FIG. 4B is within a range of approximately 10 to 50 kgf/cm$^2$ when the glass sheet is broken after the scribe groove 15 are directly heated and then quenched. As apparent from FIG. 4B, a feature of this case is that the residual stress is distributed locally in the vicinity of the scribe groove. Therefore, the value and distribution of residual stress after cutting for the case where the surrounding areas on both sides of the scribe groove 15 are heated are greatly different from those for the case where the scribe groove 15 is directly heated. For example, if the residual stress in the glass sheet after cutting has a value of 5 kgf/cm$^2$ or less and almost uniform distribution throughout the area at a distance of 3 mm or less from the scribe groove, it is obvious that the scribe groove 15 was not directly heated for cutting. This is because the residual stress around the scribe groove has a too low value to divide the glass sheet through direct heating and it is difficult to cause some tensile stress around the scribe groove. In addition, the residual stress is likely to be distributed around any heated area and thus if the scribe groove 15 is directly heated, the residual stress will be distributed only in proximity to the scribe groove 15 but not throughout the surroundings of the scribe groove 15.

If a high residual stress is formed locally in proximity to the scribe line as shown in FIG. 4B, the glass portion with such a high residual stress may present some problems such as glass peeling or damage. Moreover, such glass peeling may result in some damage extending to other areas with a lower residual stress.

It would be important in the break process to cause tensile stress in the surroundings of the scribe groove 15 for dividing the glass sheet 10 but the stress distribution and deformation in the glass sheet 10 as described above show that the method of heating the surrounding areas on both sides of the scribe groove 15 is more efficient than the method of directly heating the scribe groove 15. Therefore, it should be important to use some method to deform the glass sheet 10 with a bump on each side of the scribe groove 15. It should be appreciated that in this embodiment, the surrounding areas on both sides of the scribe groove 15 are heated but there is no need to use such heating method only. It should be also appreciated that the size of the bump is not so large as that by the prior art dividing method in which the glass sheet is divided by applying impact and is less than a few tenths of 1 mm.

Figure 5A:
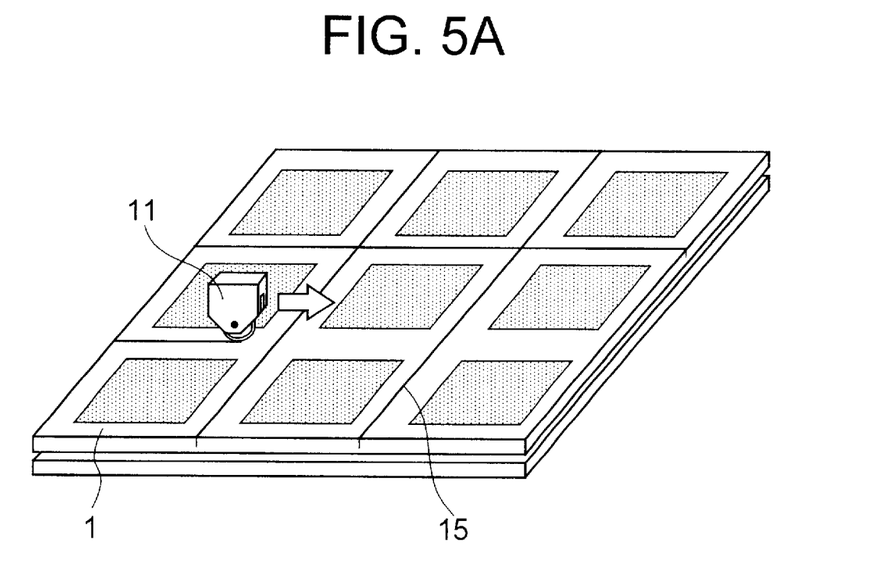
FIGS. 5A and 5B are views showing how to divide a glass sheet into liquid crystal display plates through a cutting method according to the present invention.
Figure 5B:
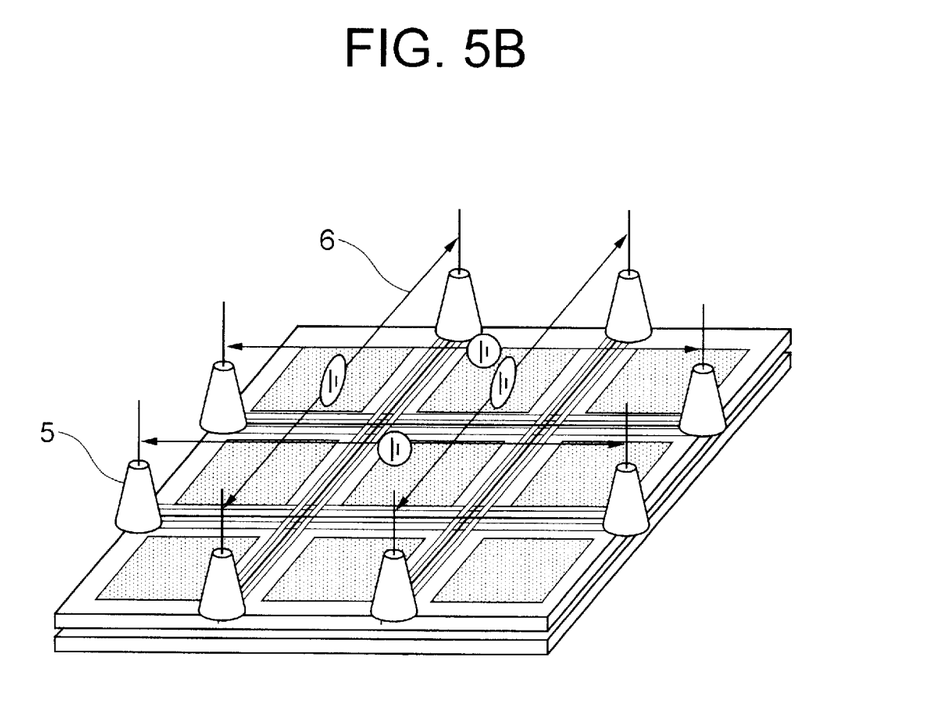

FIGS. 5A and 5B show an embodiment in which the cutting method according to the above-mentioned embodiment is applied to production of liquid crystal display plates. When the cutting method is used to divide a workpiece, that is, a liquid crystal display plate configured by bonding together two glass sheets, for example, a laminated glass plate 1 of two bonded mother glass sheets is first placed on a table with the upper mother glass sheet having a circuit element formed thereon. The upper mother glass sheet having the circuit element patterns formed thereon is scribed 11 as shown in FIG. 5A to form scribe grooves 15 on predetermined cutting lines. Then, as shown in FIG. 5B, the surrounding areas on both sides of each scribe groove are heated with wire- or strip-like heating elements composed of Nichrome wires. This heating is accomplished, for example, by bringing a probe 5 into contact with an end of each strip-like heating element and electrically energizing 6 the probe. This causes some tensile stress around the scribe grooves 15 on the mother glass sheet having the circuit element patterns formed thereon to extend vertical cracks in the scribe grooves 15 so that the mother glass sheet having the circuit element patterns formed thereon is divided.

For this purpose, electrically energizing four energizing lines shown in FIG. 5B simultaneously to divide the mother glass sheet into nine liquid crystal display plates may attain a highest throughput. Alternately, electrically energizing the longitudinal and lateral lines separately may also attain a high throughput. The cutting method according to this embodiment can achieve a significantly higher cutting efficiency than the prior method of breaking the glass sheet with a rubber plate pressed against it or directly irradiating the scribe line with laser (and then cooling it).

Next, the laminated glass plate 1 is turned upside down and then placed on the table with the mother glass sheet having color filter patterns formed thereon faced upward. The mother glass sheet having the color filter patterns formed thereon is scribed to form scribe grooves 15 on predetermined cutting lines. Then, the mother glass sheet having the color filter patterns formed thereon is divided by heating it in a similar manner to that for the other mother glass sheet having the circuit element patterns formed thereon. It should be appreciated that the heating method of electrically energizing four energizing lines simultaneously to divide the mother glass sheet into nine liquid crystal display plates as described above can be applied to this mother glass sheet with similar effects to those described above.

It should be appreciated that, in each of the nine liquid crystal display plates, residual stress is distributed uniformly in a certain area around the edge including a scribe line as described above but, of course, no residual stress exists in an area around the other edges irrelevant to cutting (the four edges of the mother glass sheet). Namely, only a liquid crystal display plate cut out from the center of the mother glass sheet includes four edges having residual stress and each of the other liquid crystal display plates includes two or three edges having residual stress. It should be further appreciated that the cutting method according to the present invention can be applied not only to a plurality of edges but to a single edge with similar effects to those described above.

In this way, two bonded glass sheets can be divided without large bending deformation in or impact on them.

Figure 6A:
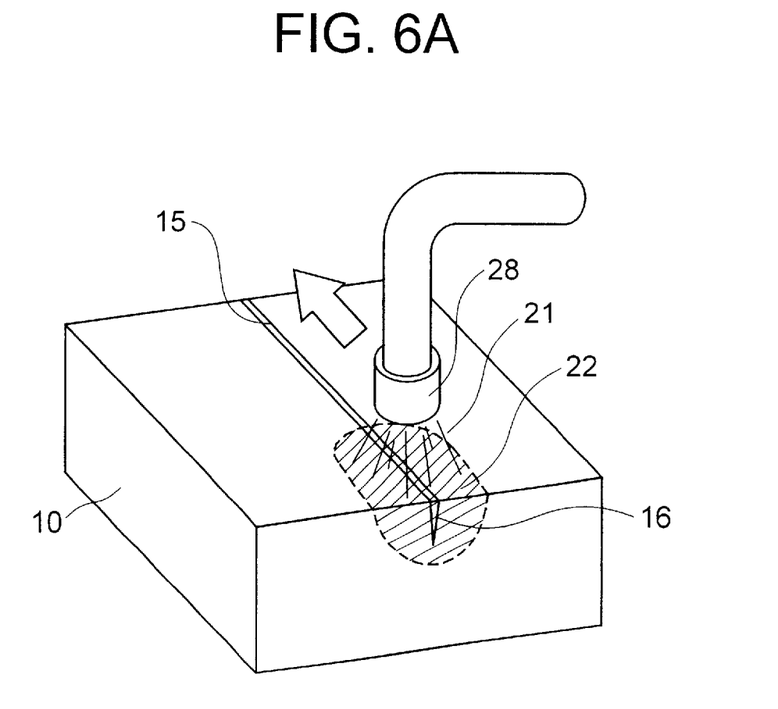
FIGS. 6A and 6B are views showing how to cool and heat a glass sheet through a method and apparatus for cutting a glass sheet according to the second embodiment of the invention.
Figure 6B:
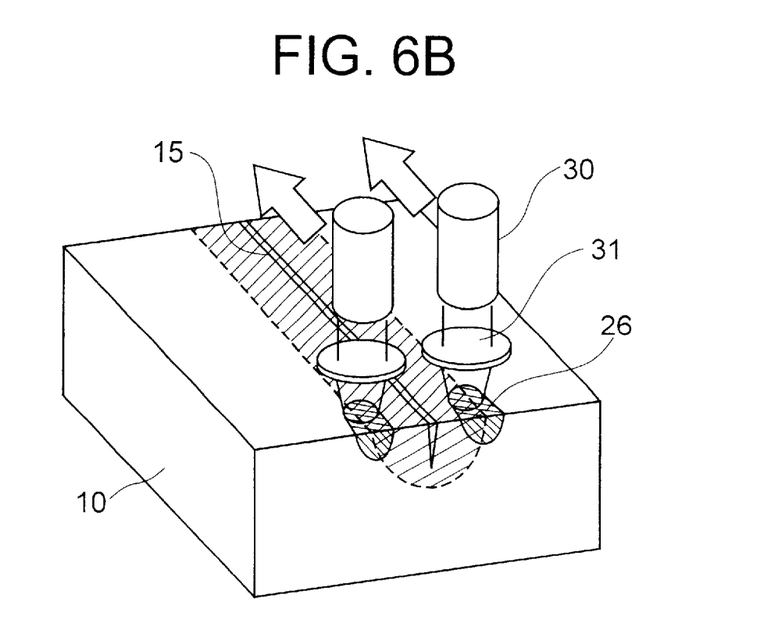

Next, a second embodiment of the present invention will be described hereinafter. FIGS. 6A and 6B show a method and apparatus for cutting a glass sheet according to the second embodiment of the present invention.

As shown in FIG. 6A, a scribe groove 15 and its surroundings on a glass sheet 10 with the scribe groove 15 formed thereon are sequentially cooled with a coolant 21 sprayed from a nozzle 28 by moving the nozzle 28 along the scribe groove 15 from end to end on the glass sheet 10. Liquid nitrogen is used as the coolant to cool a cooled area 22 to a temperature of 0° C. or less. The nozzle 28 moves at a speed of 10 to 500 mm/s.

Next, as shown in FIG. 6B, the scribe groove 15 and its surroundings cooled by the process of FIG. 6A are sequentially heated with laser beams. Namely, the surrounding areas on both sides of the scribe groove 15 are sequentially irradiated with laser for heating by moving laser beam irradiation means 30 and lens 31 along the scribe groove 15 from end to end on the glass sheet 10 but the scribe groove 15 itself is not irradiated.

It should be appreciated that this embodiment adopting such an approach can also cut the glass sheet along any scribe groove with similar effects to those of the first embodiment described above. Alternately, in this embodiment, the glass sheet 10 can be cut without any coolant by irradiating the surrounding areas on both sides of the scribe groove 15 with laser beams for heating. It should be further appreciated that means for applying heat is not limited to laser beams and another approach in which Nichrome wires are electrically energized may have similar effects.

Figure 7:
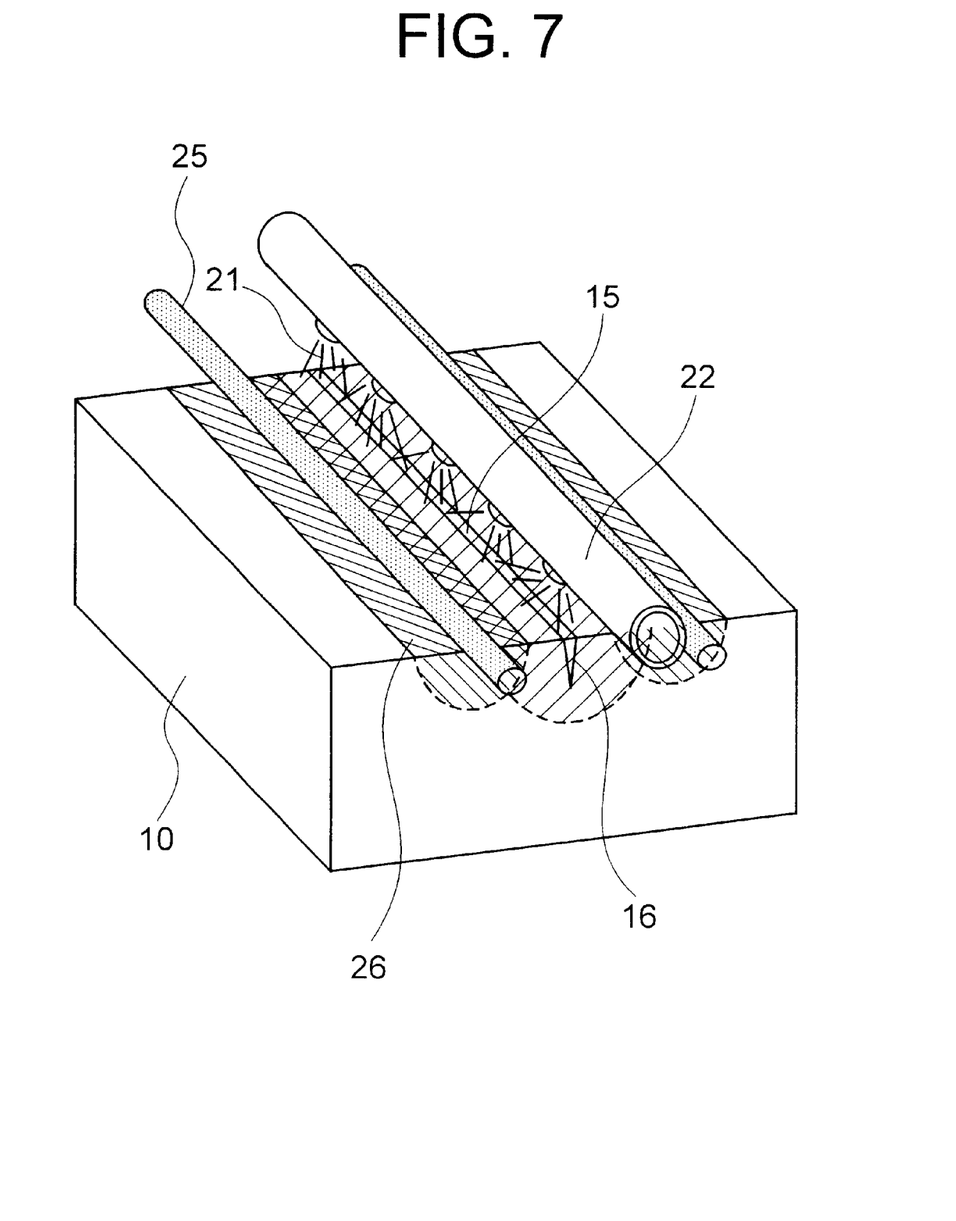
FIG. 7 is a view showing how to cool and heat a glass sheet through a method and apparatus for cutting a glass sheet according to the third embodiment of the invention.

Next, a third embodiment of the present invention will be described hereinafter. FIG. 7 shows a method and apparatus for cutting a glass sheet according to the third embodiment of the present invention.

According to this embodiment, a scribe groove 15 and its surroundings, which constitute an area to be cooled, are cooled as a whole by spraying them with a coolant 21 through a cooling pipe 20 having a large number of spray holes drilled in line and at the same time, the surrounding areas on both sides of the scribe groove 15, which constitute an area to be heated, are heated with a wire- or strip-like heating elements 25 to cause some tensile stress around the scribe groove 15 to extend a vertical crack 16 for eventually dividing the grass sheet 10.

It should be appreciated that this embodiment adopting such an approach can also cut the glass sheet along any scribe groove with similar effects to those of the first embodiment described above. It should be further appreciated that the break process can be reduced in time as compared with the first embodiment described above and the glass sheet 10 can be cut more efficiently because the cooling and heating processes are performed simultaneously.

Figure 8:
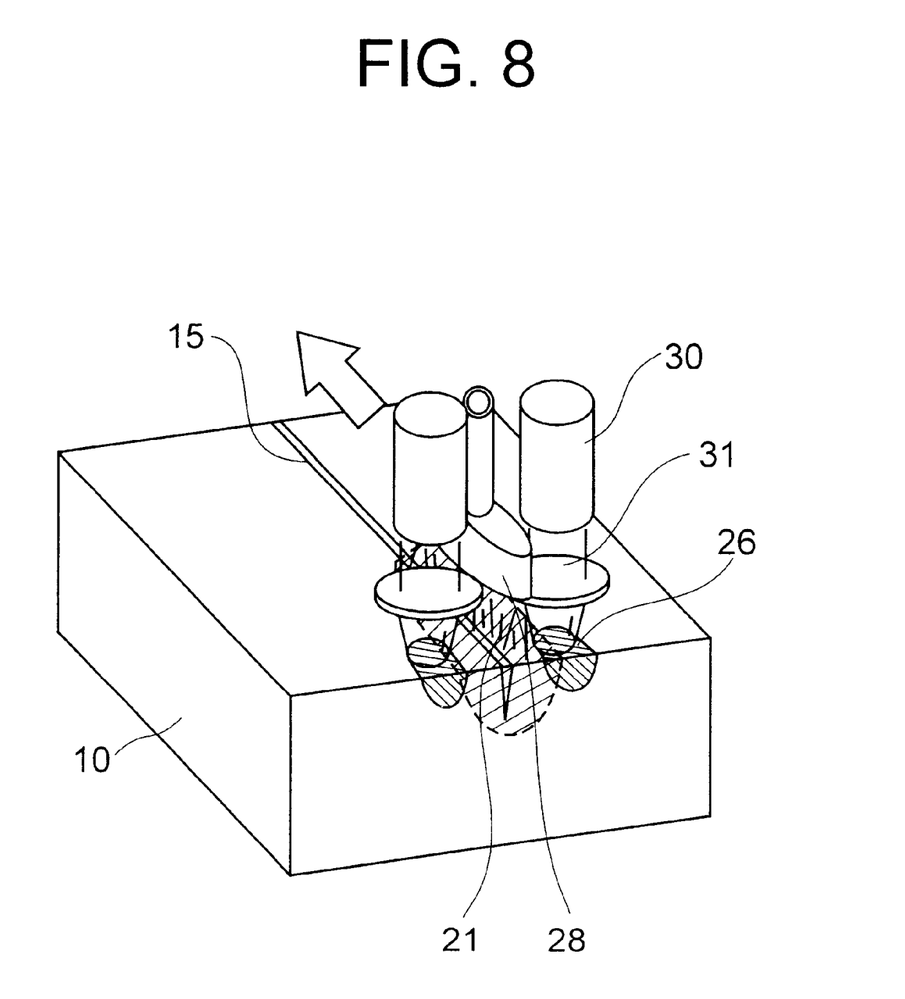
FIG. 8 is a view showing how to cool and heat a glass sheet through a method and apparatus for cutting a glass sheet according to the fourth embodiment of the invention.

Next, a fourth embodiment of the present invention will be described hereinafter. FIG. 8 shows a method and apparatus for cutting a glass sheet according to the fourth embodiment of the present invention.

According to this embodiment, a scribe groove 15 and its surroundings are sequentially cooled with a coolant 21 sprayed from a nozzle 28 by moving the nozzle 28 along the scribe groove 15 and at the same time, the surrounding areas on both sides of the scribe groove 15 are sequentially irradiated with laser for heating by moving laser beam irradiation means 30 and lens 31 along the scribe groove 15 but the scribe groove 15 itself is not irradiated.

It should be appreciated that this embodiment adopting such an approach can also cut the glass sheet along any scribe groove with similar effects to those of the second embodiment described above. It should be further appreciated that the break process can be reduced in time as compared with the second embodiment described above and the glass sheet 10 can be cut more efficiently because the cooling and heating processes are performed simultaneously.

Figure 9:
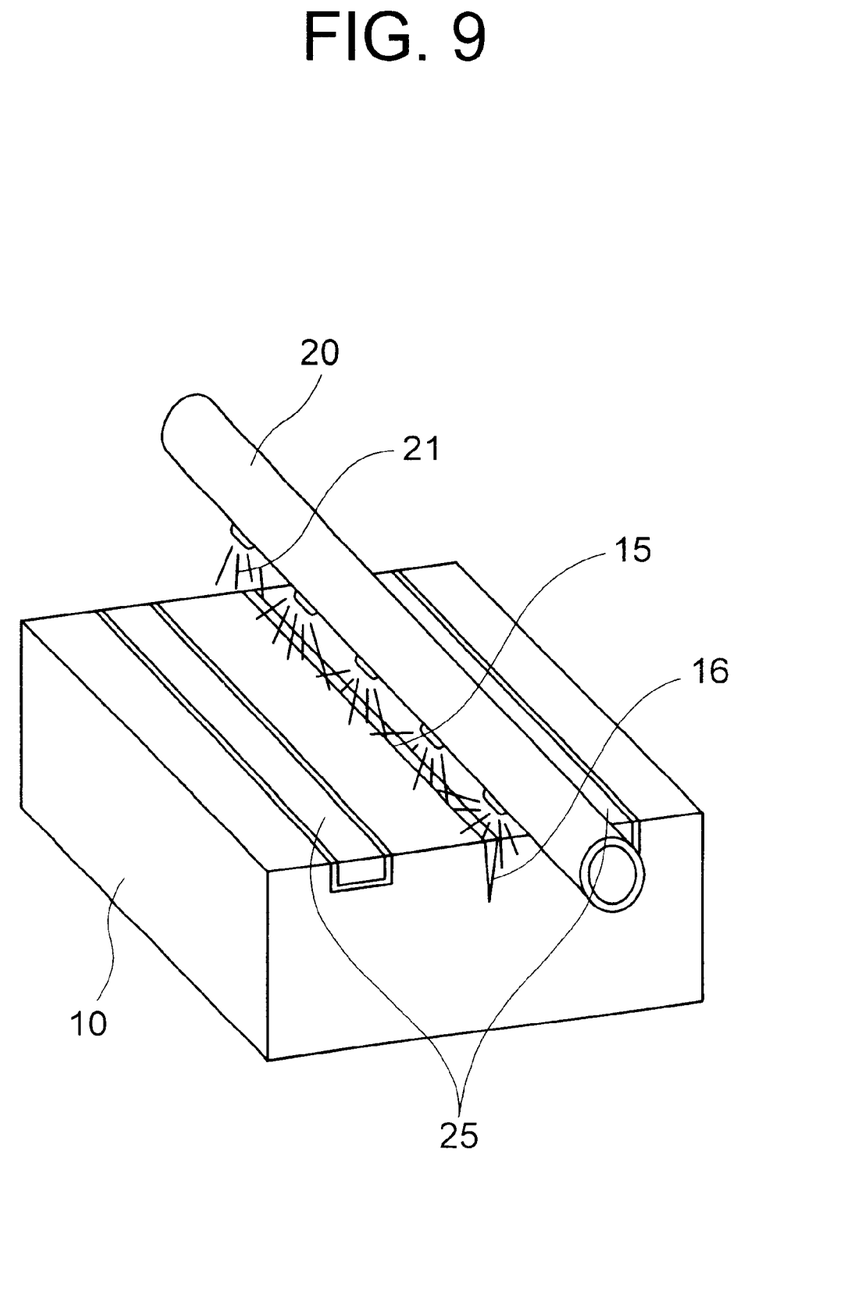
FIG. 9 is a view showing how to cool and heat a glass sheet through a method and apparatus for cutting a glass sheet according to the fifth embodiment of the invention.

Next, a fifth embodiment of the present invention will be described hereinafter. FIG. 9 shows a method and apparatus for cutting a glass sheet according to the fifth embodiment of the present invention.

According to this embodiment, a scribe groove 15 and its surroundings, which constitute an area to be cooled, are cooled as a whole by spraying them with a coolant 21 through a cooling pipe 20 having a large number of spray holes drilled in line in a similar manner to that for the first and third embodiments described above. Immediately after the cooling process or concurrently with the cooling process, the surrounding areas on both sides of the scribe groove 15 are heated with a wire- or strip-like heating elements 25 which have been previously buried in, affixed to, or adhered to the glass sheet 10 in the surrounding areas on both sides of the scribe groove 15. It should be appreciated that the heating element 25 may be Nichrome wires as described above or a heating resistor produced during the formation of a circuit pattern on the glass sheet. It should be also appreciated that a heating element 25 which produces some heat through chemical reactions may be used instead of the heating element 25 which is electrically energized to produce some heat as described above.

It should be appreciated that this embodiment adopting such an approach can also cut the glass sheet along any scribe groove with similar effects to those of the first and third embodiments described above. It should be further appreciated that the configuration of heating means can be simplified by this embodiment.

It should be appreciated that in the above described embodiments, only the scribe groove and its surroundings are cooled but the whole glass sheet or the whole working apparatus may be cooled. It should be also appreciated that liquid nitrogen is a efficient cooling medium but other cooling mediums which is capable of cooling the surroundings of the scribe groove at a temperature of 0° C. or less may be used.

It should be appreciated that in the above described embodiments, a thin sheet to be cut (divided) is a glass sheet but such a thin sheet may be a ceramic sheet, a thin brittle sheet of composite material, or a thin brittle sheet of gradient material (material having a property varying gradually in the direction of sheet thickness).

From the foregoing, the present invention can provide an efficient cutting method and apparatus which are accomplished by using a cutting technique for cutting a thin sheet of brittle material such as glass or ceramics through heat shrinkage without remarkable deformation or impact and which can reduce as low as possible the likelihood that some cracks will be caused in the in-plane direction in the thin sheet or some glass piece will be peeled off along a scribe groove, avoiding any performance degradation in glass sheets in a final product.

What is claimed is:

1. A liquid crystal display apparatus having a liquid crystal display plate, wherein a value of residual stress at a distance of 2 mm to 3 mm from edges of said liquid crystal display plate is approximately constant within a range of 0.1 to 5 kgf/cm$^2$.

2. A liquid crystal display apparatus having a liquid crystal display plate, wherein a value of residual stress at a distance of 2 mm to 3 mm from at least one edge of said liquid crystal display plate is approximately constant within a range of 0.1 to 5 kgf/cm$^2$.

3. A liquid crystal display apparatus having a liquid crystal display plate, wherein a value of residual stress at a distance of 2 mm to 3 mm from edges of said liquid crystal display plate is approximately constant within a range of 0.1 to 10 kgf/cm$^2$.

4. A liquid crystal display apparatus having a liquid crystal display plate, wherein a value of residual stress at a distance of 2 mm to 3 mm from at least one edge of said liquid crystal display plate is approximately constant within a range of 0.1 to 10 kgf/cm$^2$.

* * * * *